United States Patent [19]

Herrmann

[11] Patent Number: 5,040,325
[45] Date of Patent: Aug. 20, 1991

[54] ROTATING FISHING RIG

[76] Inventor: Heinz A. Herrmann, 2nd St., Pennsburg, Pa. 18073

[21] Appl. No.: 461,831

[22] Filed: Jan. 8, 1990

[51] Int. Cl.⁵ .............................................. A01K 85/00
[52] U.S. Cl. .................... 43/42.36; 43/42.4; 43/42.05
[58] Field of Search .................. 43/42.36, 42.05, 43.1, 43/42.04, 42.49, 42.4

[56] References Cited

U.S. PATENT DOCUMENTS

| | | | |
|---|---|---|---|
| 1,611,644 | 12/1926 | Johnson | 43/42.36 |
| 1,766,532 | 6/1930 | Pflueger | 43/43.1 |
| 1,768,033 | 6/1930 | Deatz | 43/42.4 |
| 2,625,767 | 1/1953 | Pokras | 43/42.36 |
| 2,926,452 | 3/1960 | Lewis | 43/42.4 |
| 3,388,495 | 6/1968 | Minser | 43/42.05 |
| 3,740,889 | 6/1973 | Scott | 43/42.36 |
| 3,867,781 | 2/1975 | Wolfe | 43/42.36 |
| 3,908,298 | 9/1975 | Strader | 43/42.05 |
| 3,914,895 | 10/1975 | Mize | 43/42.05 |
| 4,163,337 | 8/1979 | Kress | 43/42.36 |

Primary Examiner—Kurt Rowan
Attorney, Agent, or Firm—Joseph W. Molasky & Assocs.

[57] ABSTRACT

The rotating parts of swivels and other sharp protruding parts of a fishing rig are protected against picking up weeds or other debris by covers which are secured to the fishing lien and constructed and arranged to surround said parts.

4 Claims, 2 Drawing Sheets

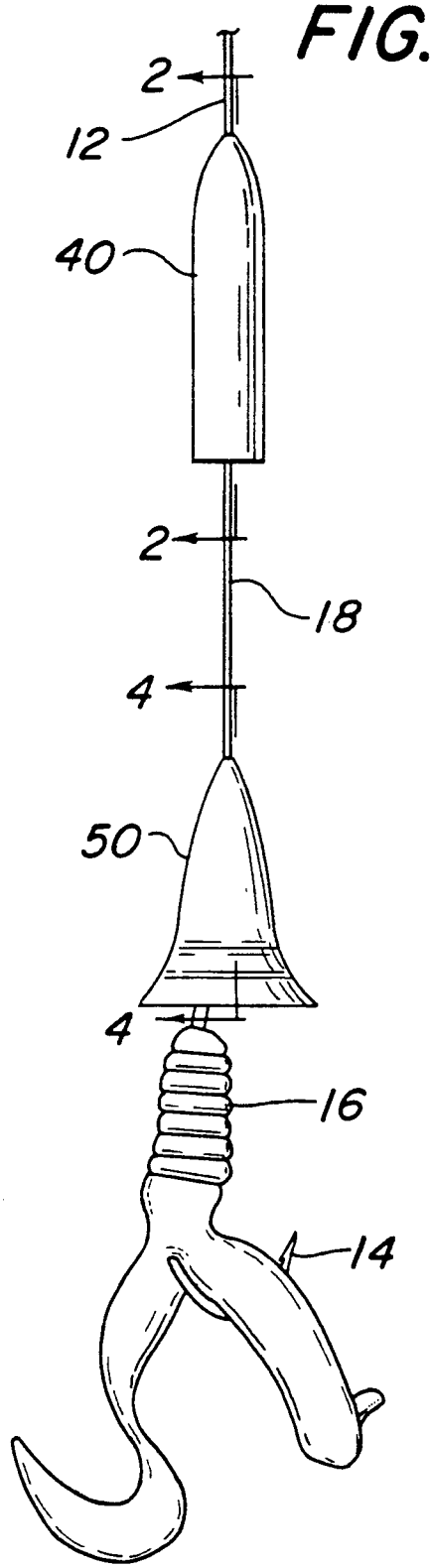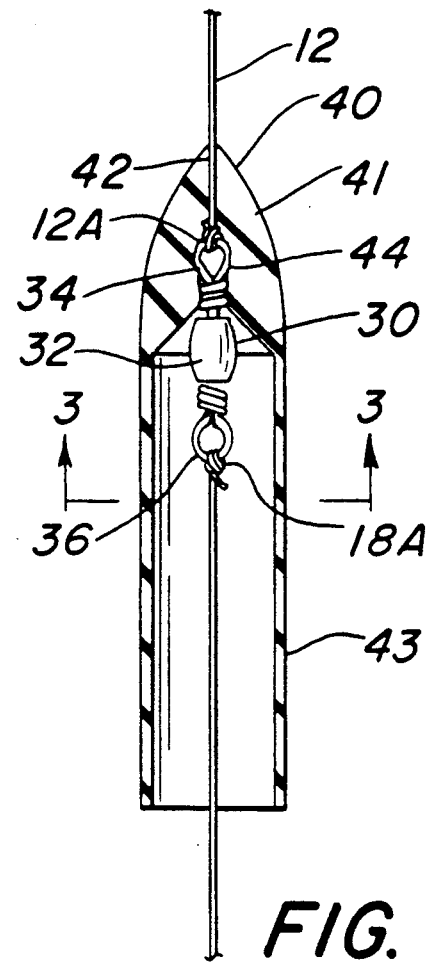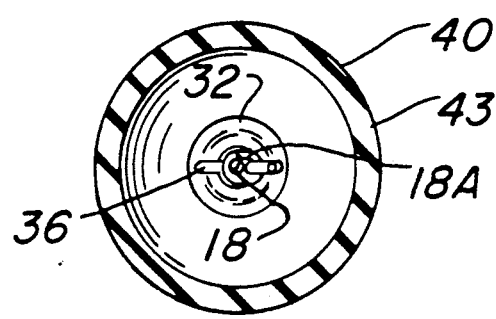

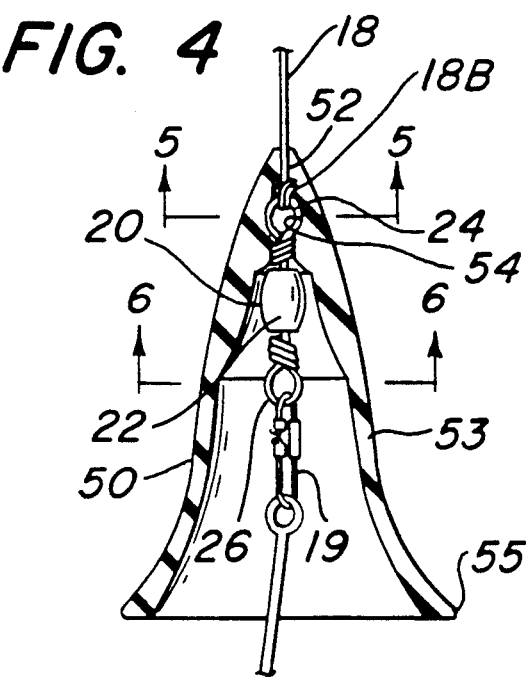
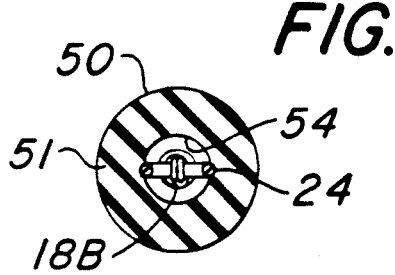
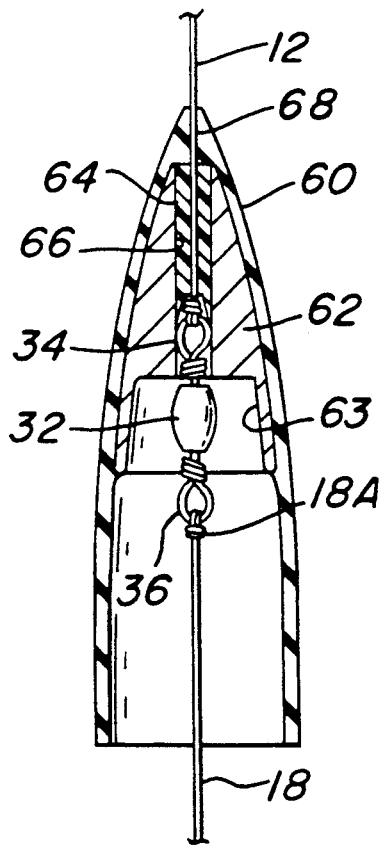

ROTATING FISHING RIG

BACKGROUND OF THE INVENTION

1. Field of the Invention

This invention relates generally to fishing rigs and, more particularly, to fishing rigs of the type used in ocean, bay, stream or lake fishing and provided with lures.

2. Description of the Prior Art

Fishing rigs of the indicated type are generally provided with a hook having a lure attached thereto and connected on the end of a leader line by a swivel, the other end of the leader line being connected to the fishing line by another swivel. A connector clip, or catch, is usually used to connect the eyelet at the upper end of the hook to the swivel at the lower end of the leader line. In the use of this prior art fishing rig, there are provided a number of sharp protruding parts, some of which rotate as the fishing rig is moved through the water, whereby these parts can easily pick up weeds, grass and other debris during fishing. A fishing rig entangled with a substantial amount of this debris will not attract fish and may give a false indication of a "bite". This is particularly a problem in the case of the trolling or casting type of fishing. Since the fisherman has to spend a considerable amount of time removing the weeds and other debris picked up by these parts of the fishing rig, this time is wasted and taken away from the actual fishing.

SUMMARY OF THE INVENTION

It is the general object of the invention to provide a novel cover means or guard which can be used with fishing rigs of the indicated type to protect against the various parts of the rig picking up weeds, grass or other debris.

In accordance with the general object of the invention there is provided a cover or guard which is adapted to be mounted on the fishing line in the region of the hook. The cover includes a first portion constructed and arranged to provide frictional engagement between the line and a swivel connected thereto and a hollow portion extending from the first cover portion and surrounding the swivel means for protecting the same against entanglement with weeds and other material during fishing. Further, there is provided a cover which is mounted on the fishing line and in the location of the hook at the bottom of a leader line and is constructed and arranged to surround the swivel and other protruding parts at this location to protect the same from entanglement with weeds and other material that could collect thereon during fishing. This cover also protects live bait from being ripped off the hook when moving through weeds or the like.

BRIEF DESCRIPTION OF THE DRAWINGS

FIG. 1 is an elevational view showing a fishing rig of the type provided with a lure and comprising the protective cover means in accordance with the invention.

FIG. 2 is a sectional view taken on line 2—2 of FIG. 1.

FIG. 3 is a sectional view taken on line 3—3 of FIG. 2.

FIG. 4 is a sectional view taken on line 4—4 of FIG. 1.

FIG. 5 is a sectional view taken on line 5—5 of FIG. 4.

FIG. 6 is a sectional view taken on line 6—6 of FIG. 4.

FIG. 7 is a sectional view showing another type of protective cover means in accordance with the invention.

DETAILED DESCRIPTION OF THE PREFERRED EMBODIMENTS

In FIGS. 1-6 there is shown a typical fishing rig provided with the novel cover means in accordance with the invention. The fishing rig is indicated generally at 10 and is attached at the end of a fishing line 12 by a conventional arrangement. The fishing rig 10 includes a hook 14 and a lure 16 attached to the hook 14. The hook 14 is attached to the lower end of a steel leader line 18 by a conventional arrangement including a connector clip 19 and a swivel 20 attached to the lower end of leader line 18 as best shown in FIG. 4. The upper end of leader line 18 is attached to a swivel 30 which connects leader line 18 to the end of the fishing line 12 as is best shown in FIG. 2.

Swivels 20 are of a well known conventional construction and each comprises a pair of eyelet providing members rotatably mounted in and extending in opposite directions from a body. Thus, swivel 20 comprises a body 22 and a pair of members 24 and 26 rotatably mounted therein and extending in opposite directions therefrom, said members 24 and 26 providing eyelets for receiving parts of the fishing rig 10 as described hereafter. Similarly, swivel 30 comprises a body 32 and a pair of members 34 and 36 rotatably mounted therein and extending in opposite directions therefrom, said members 34 and 36 providing eyelets for connection to parts of the fishing rig 10 as described hereafter.

As shown in FIG. 4, the member 26 receives the connector clip 19 for connecting the hook 14 to the lower end of swivel 20 and the member 24 receives a knot 18B formed at the lower end of leader line 18 for connecting the lower end of the leader line 18 to the upper end of swivel 20. As shown in FIG. 2, the upper end of leader line 18 is connected by a knot 18A to the eyelet provided by member 36 at the lower end of swivel 30 and the fishing line 12 is connected by a knot 12A to the eyelet provided by member 34 at the upper end of swivel 30.

The above-described arrangement is typical of a fishing rig of the type which includes a lure or live bait associated with a hook and is adapted to be used in ocean, bay, lake or stream fishing by either casting or trolling.

In accordance with the invention, the fishing rig 10 is provided with covers or guards which are adapted to be mounted on the fishing rig 10 and are constructed and arranged to protect various parts of the fishing rig against entanglement with weeds, grass or other material during fishing. Such means comprises a first cover 40 which has a bullet-like shape and is made of a flexible material such as a suitable plastic or rubber-like material, such as a polyethylene or polypropylene plastic or a silicone-based rubber. Cover 40 has a solid upper portion 41 constructed and arranged to provide frictional engagement between the fishing line 12 and the upper swivel 30. To this end, the upper cover portion 41 is provided with an axially extending hole 42 which extends through the upper end thereof and communicates with a small cavity 44 extending axially inwardly from the lower end of cover portion 41. The axial hole 42 is adapted to have fishing line 12 extend therethrough as shown in FIG. 4. The cavity 44 is adapted to receive the swivel member 34 in a manner to provide frictional engagement between swivel member 34 and cover portion 41. To this end, cavity 44 is made to be smaller than the width of the eyelet portion of the member 34 whereby the member 34 must be forced into the cavity 44 by pushing apart the opposing regions of the flexible cover portion 41. Accordingly, cover 40 is held in its position on fishing line 12 and will not slide out of its protective position. Cover 40 also includes a hollow portion 43 extending from the cover portion 41 in an arrangement to surround the upper swivel 30 to thereby protect the same from contact with weeds and other things that could catch thereon during fishing. Cover portion 43 is open at its lower terminal end so that cover 40 can be positioned on the fishing rig 10 as described above.

There is also provided a second cover 50 adapted to be mounted on the leader line 18 at the location of its connection to the lower swivel 20. The cover 50 is made of a material similar to cover 50, namely, a flexible plastic or rubber-like material. Cover 50 has a bell-shaped configuration as shown in FIG. 4 and has a solid portion 51 at its upper end. The solid cover portion 51 is provided with an axial hole 52 adapted to receive the leader line 18 and communicating at its lower end with a small cavity 54 adapted to receive the swivel member 24 and the knot 18B at the lower end of the leader line 18 in an arrangement as shown in FIG. 4 and so as to provide frictional engagement between swivel member 24 and cover portion 51. To this end, cavity 54 is of a size less than the width of the eyelet portion of member 24 whereby when member 24 is inserted into the cavity 54 it will be frictionally engaged to thereby hold the cover 50 in its protective position on the leader line 18 as shown in FIG. 4. Cover 50 also includes a hollow portion 53 extending from the solid cover portion 51 so as to surround the lower swivel 20, clip 19 and the upper part of hook 14 to protect the same and the various parts thereof from contact with weeds or other material that could catch thereon during fishing. The bell shape of cover 50 is such that it provides a flared out portion 55 at the terminal end thereof which serves to deflect and divert material away from the hook 14 as the rig is moved through the water during fishing. The hollow cover portion 53 of cover 50 is open at its lower end so that the cover 50 can be positioned on the fishing rig 10 as described above.

In FIG. 7 there is shown another embodiment of the invention which is adapted for use in deep sea fishing, deep lake fishing, or the like, wherein it is desired that the fishing rig 10 hang toward the bottom of the region being fished. To this end, there is provided a hollow bullet-shaped cover 60 which is to be substituted for cover 40 in the fishing rig 10. Cover 60 has secured in its upper end a lead weight 62 and a plastic sleeve 64 contained in a central, axially extending bore 66 in weight 62. The weight 62 functions as a sinker during fishing and maintains the cover 60 on the lower end of the fishing line 12 in a position so that it rests on top of the swivel 30 in a position as shown in FIG. 7. To this end, fishing line 12 extends through the central hole in sleeve 64 and up through an axial hole 68 in the upper end of cover 60. Sleeve 64 serves to protect the fishing line 12 from contact with the metallic weight 62 which could cause wear on the fishing line 12 during use as a result of a rubbing or similar action. It will be apparent that the weight 62 can be made of various sizes depending on the amount of weight needed for a particular fishing condition, in which case the downwardly extending skirt 63 of weight 62 would extend a farther distance along the length of the interior part of cover 60. It is noted that the weight 62 is hollowed out at the lower end whereat the skirt 63 is provided and in the region of the swivel 30 so as to permit the lower parts of the swivel 30 to rotate.

It will be apparent that various changes may be made in the construction and arrangement of parts without departing from the scope of the invention. For example, the fishing rig 10 can come in various different sizes and comprise various types of hooks and lures. Also, the covers can be made of various shapes and colors and can be made to be part of the lure of the fishing rig.

Further, a lead weight can be inserted into the molding of the cover 60 so that a plastic sleeve 64 would not be required. Accordingly, it is not desired to be limited except as defined by the following claims.

What is claimed is:

1. In a fishing rig including a fishing line, a hook having a lure or live bait associated therewith, and swivel means for attaching the hook to the line to permit rotation thereof, the swivel means having an upper swivel and a lower swivel and including a leader line extending between said upper and lower swivels, the upper swivel being connected to the end of the fishing line and the lower swivel having said hook attached thereto, the improvement comprising:

a first cover adapted to be mounted on the fishing line, said first cover having a first portion constructed and arranged to provide frictional engagement between the fishing line and the upper swivel and a hollow portion extending from said first cover portion and surrounding said upper swivel to protect the same from contact with weeds and other material that could catch thereon, and a second cover adapted to be mounted on the leader line at the location of the connection thereof to the lower swivel, said second cover including a first portion constructed and arranged to provide frictional engagement between the leader line and the lower swivel and a hollow portion extending from said first cover portion of said second cover and surrounding said lower swivel to protect the same from contact with weeds and other material that could catch thereon, said second cover being bell-shaped with said hollow portion of said second cover providing a flared out portion at the terminal end thereof.

2. In a fishing rig according to claim 7 wherein said first cover is generally bullet-shaped and said hollow portion thereof is generally cylindrical in configuration.

3. In a fishing rig according to claim 1 wherein said second cover has a sinker mounted in the first cover portion thereof for providing weight to the fishing rig.

4. In a fishing rig according to claim 3 including a sleeve mounted in said first portion of said second cover within said sinker portion, said sleeve being mounted on the leader line.

* * * * *